Jan. 28, 1969   W. A. PROUGH   3,424,496

VEHICLE PASSENGER SAFETY DEVICES

Filed Feb. 16, 1967

INVENTOR.
Wendell Arthur Prough

United States Patent Office 3,424,496
Patented Jan. 28, 1969

3,424,496
VEHICLE PASSENGER SAFETY DEVICES
Wendell Arthur Prough, 326 N. Laurel Ave.,
Ontario, Calif. 91764
Continuation-in-part of application Ser. No. 485,632,
Sept. 7, 1965. This application Feb. 16, 1967, Ser.
No. 616,684
U.S. Cl. 297—388     12 Claims
Int. Cl. A62b 35/02

ABSTRACT OF THE DISCLOSURE

A vehicle passenger safety device having two single run belt portions detachable joined by a buckle. Each belt portion is spring-wound on a drum adjacent to where a supporting structure for the belt is secured to the vehicle floor. The safety device includes an adjusting or locking means to prevent rotation of the drum and to prevent loosening of the belt on the passenger after it has been adjusted by the locking or adjusting means.

Background of the invention

This patent application is continuation-in-part for patent application by said applicant, Group No. 460, Ser. No. 485,632, now abandoned, filed Sept. 7, 1965, For Seat Belts or Safety Belts for Use in Vehicles.

This invention relates to improvements in seat safety belts and chest safety belts to correct certain inadequacies which include: twisting and inconstant position of free ends of said belts, thus leading to nonuse of said belts because of the nuisance of adjustment of said free ends thereby presented; the use of said seat safety belts presenting a narrow rigid barrier to the soft parts of the abdomen, thus in event of vehicle collision causing possible serious injury to the internal organs of the abdomen of said passengers; and said use of said seat safety belts causing the bodies of said passengers to hinge upon the hips in event of vehicle collision, thus leading to injury of face and chest.

Summary of the invention

The invention is in a safety belt, having a single run of belt. The belt is formed in two parts, one of which is secured on one side of a seat and the other of which is secured on the other side of the seat, the two portions of belt being joined by a buckle approximately in the middle with respect to the seat. Each portion of the belt is spring-wound on a drum adjacent to where a supporting structure for the belt is secured to a car floor, for example. The invention provides a locking or breaking device which substantially automatically adjusts a belt on the user and which may be manually manipulated for more precise adjustment. The braking or locking device coacts with a single run of the belt and the drum on which the belt is spring-wound, so as to lock the drum against rotating movement in at least one direction. The locking device includes a gate movably supported by the belt supporting structure, the gate being engageable by the belt so as to move the gate between nonoperative and operative positions so that when the gate is moved into an operative position the drum is locked against rotation.

An object of the invention is to provide a vehicle passenger safety device comprised of a safety belt, spring-wound on a drum secured to the floor of an automobile, for example, the belt being retractably wound upon the drum when released by the passenger.

It is another object of the invention to provide an improved safety belt, having an adjusting or locking means to prevent rotation of the drum and to prevent loosening of the belt on the passenger after it has been adjusted by the locking or adjusting means.

It is a further object of the invention to provide a safety belt having a braking or adjusting device for modifying the length of the belt by easy adjustment to provide for less injurious braking force in the event of a collision.

Further objects and advantages of the invention may be brought out in the following part of the specification wherein small details have been described for the competence of disclosure, without intending to limit the scope of the invention which is set forth in the appended claims.

Brief description of the drawings

Referring to the accompanying drawings, which are for illustrative purposes only.

Description of the preferred embodiments

The safety belts disclosed, whether for chest or seat runs, are of the usual fabric weave, thickness, and design as used in automobiles and aircraft. The free end portions of the safety belts couple by means of a metal buckle or other fastening device as may be available in present use.

Figure 4:
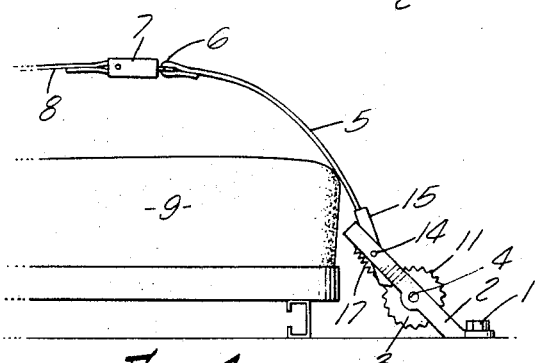
FIG. 4 is an end elevational view of the invention incorporating a braking or latching device.

The safety belts or portions thereof, are attached to and employed from a metal floor, for example, as follows:

In the gross drawings FIGS. 1, 2, 3, and 4, show said devices less brake in housings at various positions of mounting in vehicle to provide a run for safety belt across chest of passenger. In FIG. 4 chest safety belt position a said device with or without brake can be installed at or near and in place of device shown; and the safety belt portion from said device can run across passenger in customary seat belt fashion, and is hereafter referred to as FIG. 4 seat belt position as depicted in the detailed drawing FIGS. 1 through 7. Housings over devices shown are not the concern of this application but merely establish positions of said devices from which said belts may be employed to retain vehicle passengers in seats for protection against violent displacement therefrom in event of collision of vehicle.

Figure 1:
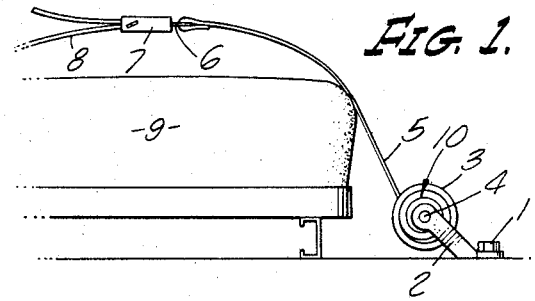
FIG. 1 is an end view of a seat on which the invention may be used, illustrating the arrangement by which a drum and end of the belt is secured to the floor of a vehicle.
Figure 2:
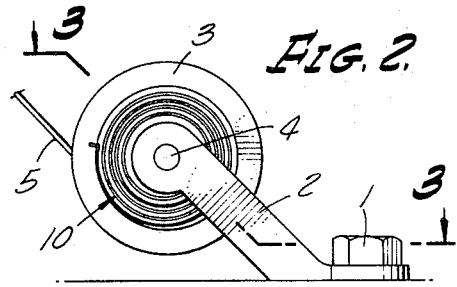
FIG. 2 is an enlarged view of the drum securing means and of the drum and its winding spring.
Figure 3:
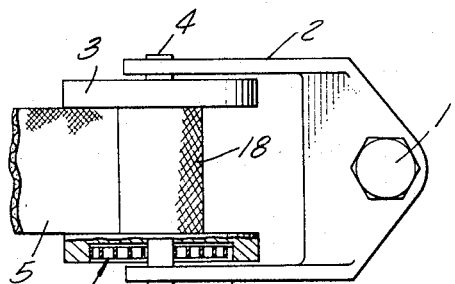
FIG. 3 is a fragmentary view, taken as indicated along the line 3—3 of FIG. 2.

Referring to FIGS. 1 through 3 of the detailed drawing, the device is shown in detail. The device has anchor means 1 attached to floor of vehicle. The sides 2 of the device support a rotatable drum 3 with roller ends 4 turnable in said sides 2. Spring means 10 is distorted by belt 5 issue from drum 3 to exert force to retract belt 5. Belt 5 is attached to roller 18 of drum 3. As illustrated by FIG. 1 the belt 5, after having been stripped manually by grasp and pull upon buckle end 6 from roller 18 until attachment thereon is attained, is then coupled by means of coupling 6 into the female buckle 7 which lies on the seat 9 at the free end of the opposite belt portion 8 whose attached end is anchored to the floor of said vehicle and not shown. This completes the safety belt around a passenger portion of seat 9. Once freed of buckle fastening 6 and 7, belt 5 retracts freely onto the drum 3. Although not shown a slit for belt run in metal cross-member fixed forward between extensions of sides 2 might be employed to position belt buckle 6 in retracted position in manner similar to FIG. 7 and where cross-member 19 would bear slit for belt run. Likewise a magnet may if needed be installed along belt run, either on side of seat 9 or on said device, to position belt buckle 6 in retracted position.

Figure 5:
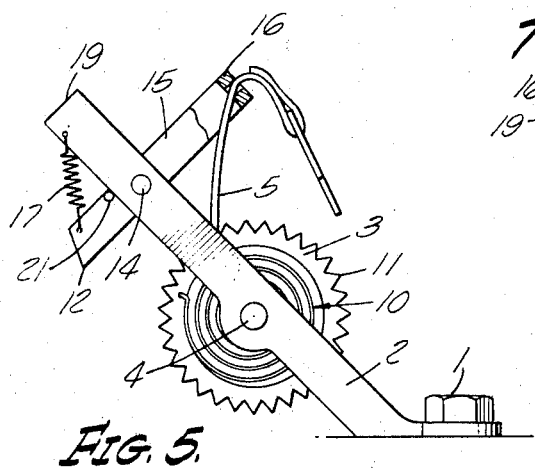
FIG. 5 is an enlarged view of the belt drum and securing means, illustrating the braking device in a disengaged position.
Figure 6:
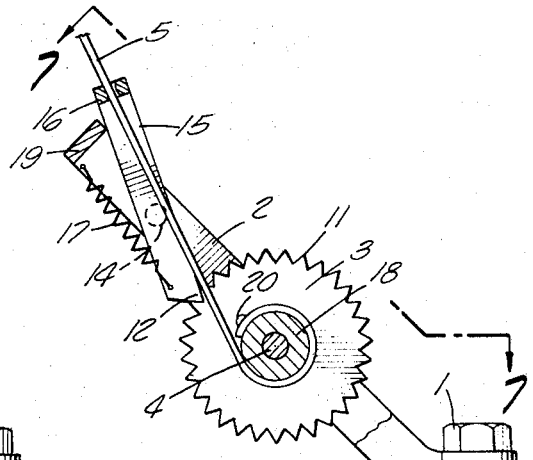
FIG. 6 is a view similar to FIG. 5 and wherein the latching device has been moved into a locking or operative position from the nonoperative position shown in FIG. 5.
Figure 7:
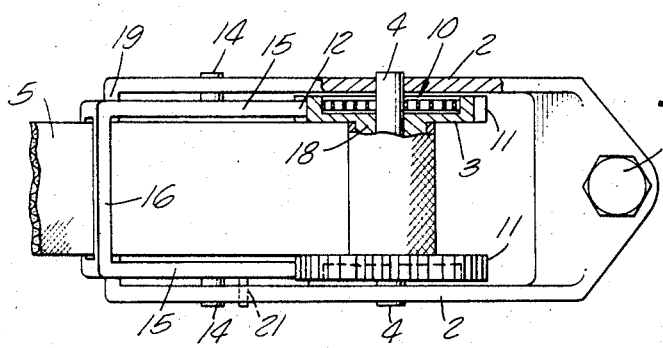
FIG. 7 is plan view of the device as shown in FIG. 6, taken substantially along the line 7—7 in FIG. 6.

Referring to FIGS. 4, 5, 6 and 7 of the detailed drawing, the said device brake modified is shown. The sides 2 of the said device are extended to enable a rectangular gate of metal frame, consisting of sides 15, proximal cross-member 12, distal cross-member 16 with slit for belt 5 run, able to swing on studs 14 inserted into said device sides 2, and excursion of said gate limited by metal stop 21 and said device cross-member 19. Additional control of gate movement as needed is provided by a coil spring 17. The sides of the drum 3 are equipped with ratchet teeth 11, which with cross-member 12, can form a brake to locate drum 3. Said device brake modified is operated as follows:

With belt 5 in retracted position as in FIG. 5, passenger grasps buckle end 6 manually and pulls belt 5 upward through slit of cross-member 16 until length of belt 5 is sufficient to fasten buckle parts 6 and 7. Upon fastening belt portions as in FIG. 4, the increased tension upon belt 5 by drum 3 from distorted spring 10 together with change of direction of belt 5 exerts pressure on cross-member 16 so as to swing gate thus engaging cross-member 12 against ratchet teeth 11. Said gate movement is further limited by sides 15 stopping at said device cross-member 19. Final adjustment of length of belt 5 can be made by manual manipulation of cross-member 16. The possibility exists of sheering stress of cross-member 12 and or stripping of metal ratchet teeth 11 providing further gradual braking force upon passenger in event of severe collision.

I claim:

1. In a safety belt device for use on vehicles, the combination including:
  (a) a supporting structure adapted to be secured to said vehicle;
  (b) a drum rotatably mounted on said supporting structure;
  (c) a single run of a belt adapted to be wound on said drum, layer upon layer of said single run;
  (d) spring means for rotating said drum in a direction to wind said belt thereon;
  (e) means adjacent the free end of said single run of belt operative to secure said single run of belt across a portion of the body to be retained in position in said vehicle; and
  (f) means coacting between said single run of belt and said drum whereby said drum is locked against rotating movement in at least one direction.

2. The structure as described in claim 1 wherein:
  (a) said means coacting between said single run of belt and said drum includes a gate movably supported by said supporting structure, said gate being engageable by said single run of belt and movable between nonoperative and operative positions;
  (b) whereby upon movement of said gate into said operative position said drum is locked against rotation.

3. A safety belt arrangement as defined in claim 2 which includes:
  (a) said gate having a slot through which said single run of belt extends.

4. A safety belt arrangement as defined in claim 2 in which said last means includes:
  teeth means on said drum and pawl means on said gate.

5. The structure as described in claim 2 which includes:
  spring means for yieldably urging said gate toward a nonoperative position.

6. The structure as described in claim 2, in which:
  (a) said supporting structure has a pair of sides between which said drum is rotatable, said sides having end portions which extend beyond said drum;
  (b) said gate having side portions positioned between said sides of said supporting structure, and which are pivotally connected to said sides, said gate having a cross portion with a slot therein through which said single run of belt extends.

7. In a safety belt device for use on vehicles, the combination including:
  (a) a supporting structure adapted to be secured to said vehicle;
  (b) a drum rotatably mounted on said supporting structure;
  (c) a belt adapted to be wound on said drum;
  (d) spring means for rotating said drum in a direction to wind said belt thereon;
  (e) means adjacent the free end of said belt operative to secure said belt across a portion of the body to be retained in position in said vehicle;
  (f) a gate movably supported by said supporting structure, said gate being movable between nonoperative and operative positions,
  (g) said gate and said belt being associated so that movement of said belt to unwind it from said drum and into the direction tautly toward said body moves said gate into an operative position; and
  (h) latch engaging means on said drum;
  (i) said latching engaging means being adapted to coact with means on said gate when in said operative position to lock said drum against rotation.

8. The invention according to claim 7 including: means connected to said gate and said supporting structure to normally hold said gate in said nonoperative position.

9. The invention according to claim 7 including: spring means connected to said gate and said supporting structure to control the movement of the gate as it approaches an operative position to tend to hold said gate out of said opeartive position.

10. The invention according to claim 7 in which: said gate has a slot in which said belt extends by which said gate and belt are associated.

11. The invention according to claim 7 in which: said latch engaging means are on said drum and are comprised of teeth means and said last means on said gate being pawl means.

12. The invention according to claim 7 in which:
  (a) said supporting structure has a pair of sides between which said drum is rotatable, said sides having end portions which extend between said drums;
  (b) said gate having side portions positioned between said sides of said supporting structure, and which are pivotally connected to said sides, said gate having a cross portion with a slot therein through which said belt extends and by which said gate and said belt are associated.

References Cited

UNITED STATES PATENTS

| 2,569,020 | 9/1951 | Rotherham | 242—107.4 |
| 3,100,669 | 8/1963 | Monroe | 297—388 |
| 3,193,327 | 7/1965 | Roe | 297—388 |
| 3,278,231 | 8/1966 | Hirsch et al. | 297—388 |
| 3,294,446 | 12/1966 | Fontaine | 297—388 |

JAMES T. McCALL, *Primary Examiner.*

U.S. Cl. X.R.

242—107.4